(12) United States Patent
Holland et al.

(10) Patent No.: US 10,956,590 B2
(45) Date of Patent: Mar. 23, 2021

(54) METHODS FOR SECURELY MANAGING A PAPER DOCUMENT

(71) Applicant: SAFENET INC., Belcamp, MD (US)

(72) Inventors: Christopher Holland, Cedar Park, TX (US); Russell Egan, Cedar Park, TX (US)

(73) Assignee: THALES DIS CPL USA, INC., Belcamp, MD (US)

( * ) Notice: Subject to any disclaimer, the term of this patent is extended or adjusted under 35 U.S.C. 154(b) by 186 days.

(21) Appl. No.: 16/166,770

(22) Filed: Oct. 22, 2018

(65) Prior Publication Data

US 2020/0125749 A1  Apr. 23, 2020

(51) Int. Cl.
*G06F 21/00* (2013.01)
*G06F 21/62* (2013.01)
(Continued)

(52) U.S. Cl.
CPC ...... *G06F 21/6209* (2013.01); *G06F 16/9566* (2019.01); *G06F 21/32* (2013.01);
(Continued)

(58) Field of Classification Search
CPC ...... G06F 21/6209; G06F 21/32; G06F 21/44; G06F 21/84; G06F 16/9566; G06F 40/197
See application file for complete search history.

(56) References Cited

U.S. PATENT DOCUMENTS 8,037,157 B2  10/2011  Xiao et al.
8,364,712 B2  1/2013  O'Sullivan et al.
(Continued)

FOREIGN PATENT DOCUMENTS

| CN | 101859360 A | 10/2010 |
| CN | 102722737 A | 10/2012 |

OTHER PUBLICATIONS

Notification of Transmittal of the International Search Report and the Written Opinion of the International Searching Authority (Forms PCT/ISA/220, PCT/ISA/210, and PCT/ISA/237) dated Dec. 13, 2019, in related International Application No. PCT/US2019/055551. (12 pages).
(Continued)

*Primary Examiner* — Joseph P Hirl
*Assistant Examiner* — Chi D Nguy
(74) *Attorney, Agent, or Firm* — Buchanan Ingersoll & Rooney PC

(57) ABSTRACT

A method for securely accessing a document containing a set of data comprises (a) detecting the existence of target data belonging to an enhanced version of the document and missing from the current version of the document, (b) generating a link value allocated to the target data by applying a preset function to a subset of said set of data, (c) retrieving metadata from a secure storage unit by using the link value and, using a message based on said metadata, proposing to the user to get the target data, (d) getting both agreement of the user and credentials of the user, (e) generating a request by using the link value and said credentials for retrieving the target data from the secure storage unit, (f) providing the user with the target data only if the secure storage unit successfully checked the compliance of the request with preset access rules.

14 Claims, 3 Drawing Sheets

(51) Int. Cl.
| | |
|---|---|
| *G06F 21/44* | (2013.01) |
| *G06F 21/84* | (2013.01) |
| *G06F 21/32* | (2013.01) |
| *G06T 19/00* | (2011.01) |
| *G06F 16/955* | (2019.01) |
| *G06F 40/197* | (2020.01) |

(52) U.S. Cl.
CPC .............. *G06F 21/44* (2013.01); *G06F 21/84* (2013.01); *G06F 40/197* (2020.01); *G06T 19/006* (2013.01)

(56) References Cited

U.S. PATENT DOCUMENTS

| | | |
|---|---|---|
| 2010/0082687 A1 | 4/2010 | Saito |
| 2013/0110775 A1 | 5/2013 | Forsythe |
| 2013/0227271 A1 | 8/2013 | Pampagnin |
| 2017/0329943 A1* | 11/2017 | Choi ..................... G06F 21/602 |
| 2018/0285591 A1* | 10/2018 | Thayer ................ G06F 21/6254 |
| 2019/0340815 A1* | 11/2019 | Yildiz .................. H04N 13/239 |

OTHER PUBLICATIONS

Notification of Transmittal of the International Search Report and the Written Opinion of the International Searching Authority (Forms PCT/ISA/220, PCT/ISA/210, and PCT/ISA/237) dated Dec. 13, 2019, in related International Application No. PCT/US2019/055579. (12 pages).

* cited by examiner

| Index | URI | Short code | Metadata | Information |
|-------|-----|------------|----------|-------------|
| 11    | 12  | 13         | 14       | 15          |

61

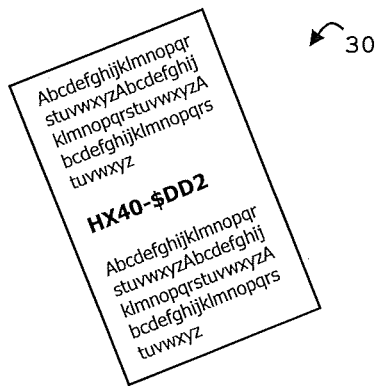
FIG. 4
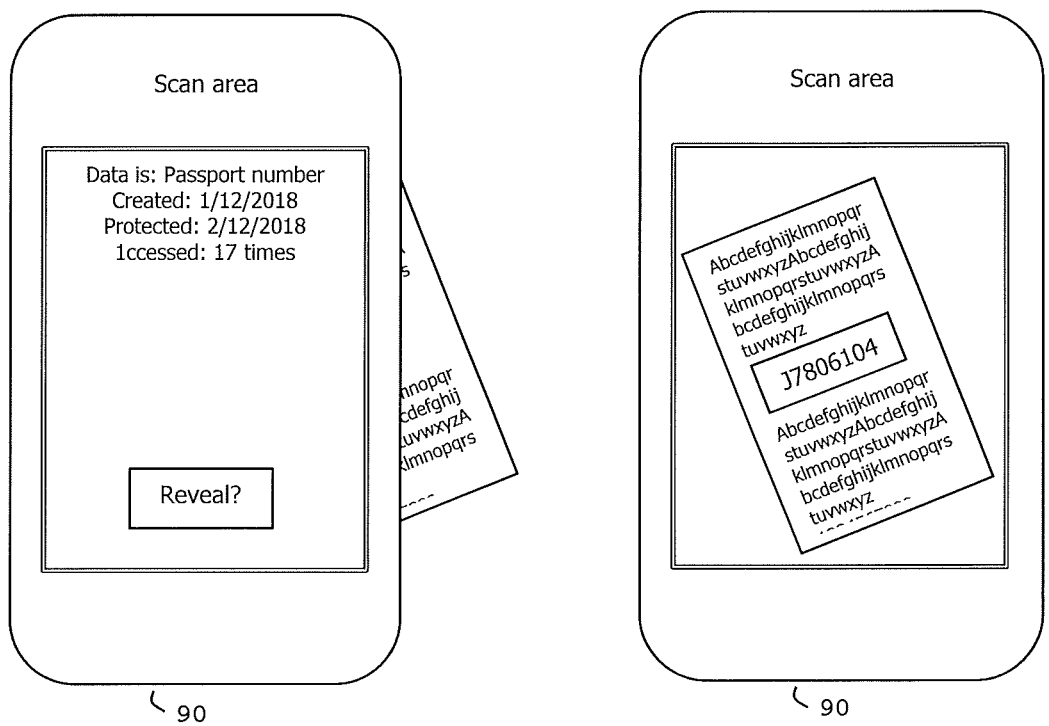
FIG. 5
FIG. 6

METHODS FOR SECURELY MANAGING A PAPER DOCUMENT

FIELD OF THE INVENTION

The present invention relates to methods for securely managing paper documents. It relates particularly to methods of securely accessing documents comprising at least two types of data requiring different security level managements.

BACKGROUND OF THE INVENTION

Many laws and company policies exist around the world to restrict access to certain classes of information stored in structured documents. It is known to redact a document in printed form. Redaction provides no simple or automated means to recover the sensitive information. This creates significant inconveniences when printed documents comprising masked sensitive data are distributed to a large number of people. There is need to provide a solution allowing for the document to be usable and freely distributed except that access to sensitive information remain restricted.

SUMMARY OF THE INVENTION

The invention aims at solving the above mentioned technical problem.

An object of the present invention is a computer-implemented method for securely accessing a document in paper form containing a set of data by a user. The method comprises:
  from a current version of the document, detecting the existence of a target data belonging to an enhanced version of the document and missing from the current version of the document,
  generating a link value allocated to the target data by applying a preset function to a subset of said set of data,
  retrieving a metadata from a secure storage unit by using the link value and, using a message based on said metadata, proposing to the user to get the target data,
  getting both agreement of the user and credentials of the user,
  generating a request by using the link value and said credentials for retrieving the target data from the secure storage unit only if the user gave his agreement, and
  providing the user with the target data only if the secure storage unit successfully checked the compliance of the request with preset access rules.

Advantageously, the subset of said set of data may include a display value that does not belong to the enhanced version.

Advantageously, the display value may be a random value.

Advantageously, the subset of said set of data may belong to the enhanced version.

Advantageously, the subset of said set of data may include a text and/or a non-text.

Advantageously, the target data may be rendered to the user through augmented reality.

Another object of the present invention is a system for securely accessing a document in paper form containing a set of data. The system comprises a hardware processor, an accessor engine including instructions that, when executed by the processor, cause said accessor engine to detect, from a current version of the document, the existence of a target data belonging to an enhanced version of the document and missing from the current version of the document, and to generate a link value allocated to the target data by applying a preset function to a subset of said set of data. The system is adapted to retrieve a metadata from a secure storage unit by using the link value and, using a message based on said metadata, proposing to a user to get the target data. The system is adapted to get both agreement of the user and credentials of the user. The system is adapted to generate a request by using the link value for retrieving the target data from the secure storage unit only if the user gave his agreement and to forward the retrieved target data to a output device for rendering to the user only if the secure storage unit successfully checked the compliance of the request with preset access rules.

Advantageously, the system may be configured to render the target data to the user through augmented reality.

Advantageously, the current version of the document may comprise a display value and the system may be adapted to display the target data in place of display value.

Advantageously, the subset of said set of data may include a text and/or a non-text.

Advantageously, said target data may be a sensitive data.

Advantageously, the system may include a capturing device able to perform optical character recognition.

Advantageously, the system may include a security device able to get a biometric data, a password or a user's secret key pre-stored in the system.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 4 depicts an example of a current version of the document in paper form according to an example of the invention;

FIG. 5 depicts an example of an output device allowing to confirm the request access to sensitive data of the document according to an example of the invention; and FIG. 6 depicts an example of an output device allowing to display the sensitive data of the document according to an example of the invention.

DETAILED DESCRIPTION OF THE PREFERRED EMBODIMENTS

The invention may apply to any type of document comprising several types of data that need to be managed according to different security policies. It is well-suited for managing structured documents comprising sensitive data. It applies to any printed document (whatever the medium) like a text file or a spreadsheet document, regardless of their format.

Figure 1:
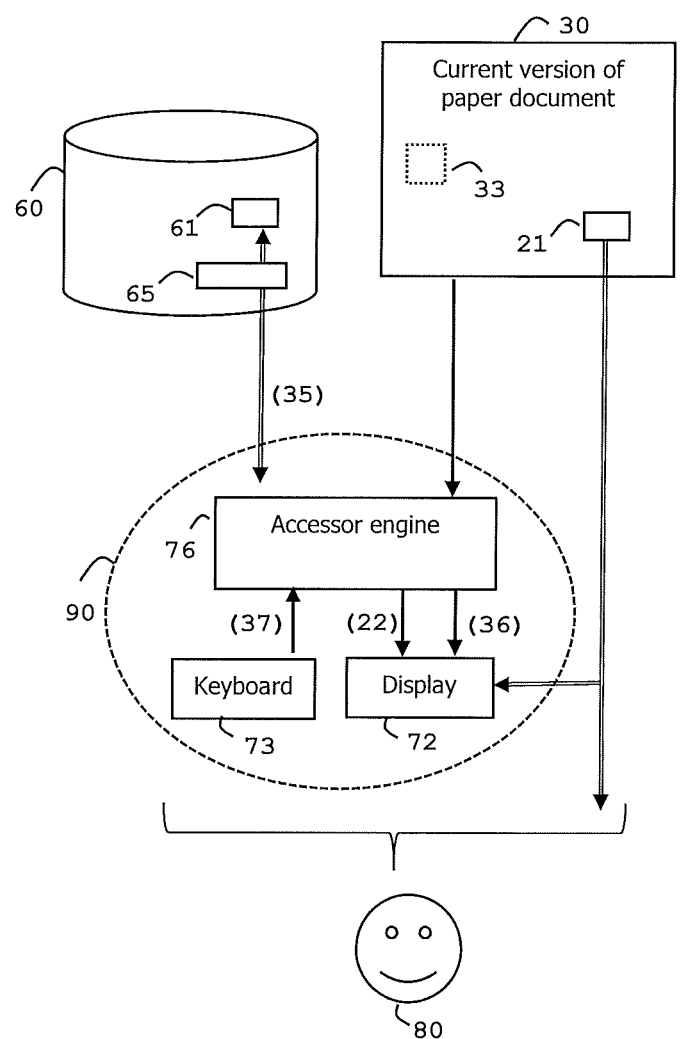
FIG. 1 shows an example of architecture of a system for securely accessing data belonging to the protected document according to the invention.

FIG. 1 shows an example of architecture of an accessing system 90 for securely accessing data belonging to the protected document according to the invention.

The accessing system 90 is intended to allow a user 80 to access the full content of a protected document. A current version 30 in paper form of the document is assumed to be available for the user.

The user may be an individual, a software application or a computer machine.

Let's assume that an initial version (not shown) of the document contains a set of data including at least two type of data. For instance the initial version can contain both a non-sensitive data 21 and a sensitive data 22. An automated system (not shown) can be designed to take as input data both the initial version of the document and a list of data of the second type (e.g. sensitive data) contained in the initial version of the document. The list may be built by a so-called automated Data Discovery and Classification Process.

For example data of the second type may be financial reports, medical information, personally identifiable information (PII) or confidential data.

A current version 30 of the document is assumed to have been generated from the initial version 20 by removing all data of the second type and creating as many entries in a secure storage unit 60. Each entry contains a link value allocated to a data of the second type. Each data of the second type is reachable in the secure storage unit through its allocated link value.

In this example, the secure storage unit 60 is deployed in cloud environment.

It is to be noted that the data of the first type (e.g. non-sensitive data) remain present in both the initial version and the current version 30 of the document.

In one embodiment, a display value (noted 33 at FIG. 1) may be inserted in place of a removed data in the current version 30 of the document. The display value can be text or a non-textual information like an icon or a button.

In one embodiment, the display value may contain a subset of the link value. For instance the display value can be a machine readable URL.

In one embodiment, the display value may contain a random value.

The initial version of the document may also comprise data of more than two types and the link values may have been previously created using different functions (and policy to select the input parameter) according to each type of data.

The secure storage unit 60 can include a database (or a file system), a set of access rules and a controller engine 65 able to check whether a request trying to access a record stored in the secure storage unit complies with the access rules. The controller engine is able to authorize or deny the request according to predefined access rules. The controller engine may check user's credentials like a passphrase, a biometric data, a One-Time password or a cryptographic value computed from a secret key allocated to the user for example. The controller engine 65 can be implemented as a software application executed by a hardware processor.

Figures 2, 3:
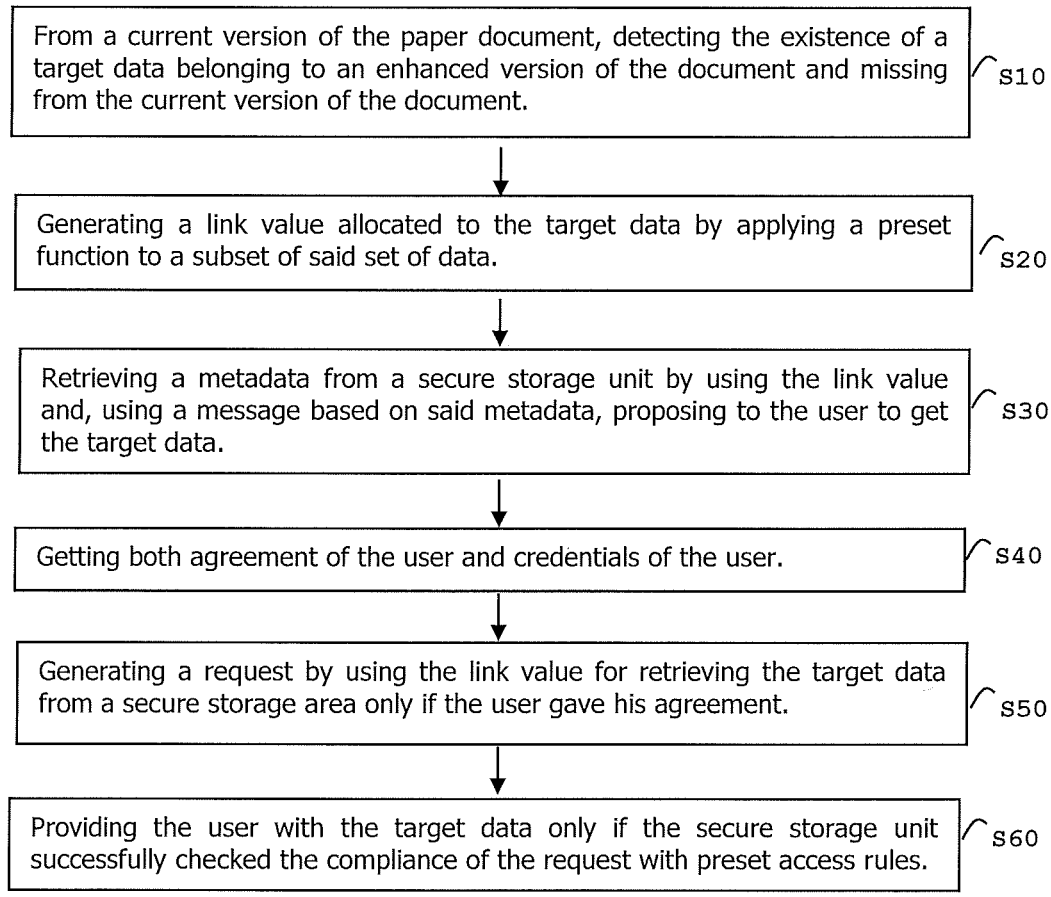
FIG. 2 depicts a flow chart for securely accessing a document according to an example of the invention.
FIG. 3 depicts an entry stored in the secure storage unit according to an example of the invention.

Each entry stored in the secure storage unit 60 can comprise several fields. As shown at FIG. 3, For example, an entry 61 may contain the following elements:
 a) an Index 11 which has a unique value allowing to identify the entry among the others,
 b) a URI 12 which includes the link value,
 c) a Short Code 13 which contains the display value,
 d) Metadata 14 that may contain various data like the entry creation/update date, author, country origin, file name of the updated version of the document, and
 e) Information 15 which is a data removed from the initial version of the document.

Coming back to FIG. 1, in one embodiment, the access rules stored in the secure storage unit 60 can be defined according to the profile of the users. For instance, a user accredited at level 2 is authorized to access all types of data while a user accredited at level 1 can only access data of first type.

In one embodiment, the access rules can be defined according to both the profile of the user and the type of data. For instance, a financial data can be accessed only by Finance employees.

In another embodiment, the access rules can be defined so as to take into account the type of user's device (i.e. System 90). For instance a Personal computer may be assumed to be more secure than a smart phone.

In one embodiment, the access rules can be defined to take into account the user's location. Thus access to a target data type can be restricted to users located in the company office only for instance.

In another embodiment, the access rules can define access rights which are set with an expiration date.

The secure storage unit 60 can be configured to log any attempt to access data of the second type from the current version of the document. Hence repeated unauthorized attempts may be detected and trigger appropriate security measures. Such log may also be used to monitor and size the secure storage unit 60.

The accessing system 90 for securely accessing data belonging to the current version 30 of the document can be deployed on a client device. For instance, it may be hosted in a laptop or a smartphone.

The system 90 comprises a processor and an accessor engine 76 including a first set of instructions that, when executed by the processor, cause the accessor engine to detect, from the current version 30 (paper form) of the document, the existence of a target data belonging to a previous version (e.g. initial version) of the document and missing from the current version 30 of the document. The accessor engine 76 detects existence of a target data by using a set of context data which can include a text or a non-text.

For example, the accessor engine 76 can be adapted to detect the presence of a predefined list of fields in the current version 30 for deducing the existence of a target data belonging to the enhanced version (and also to the previous version) of the document. For instance, the accessor engine 76 can be configured to detect a field named "secret key", "passport number" or "Amount" and to deduce that a corresponding sensitive data should be retrieved from the secure storage unit.

In another example, the accessor engine 76 can be adapted to detect the presence of a predefined list of patterns (or tokens) which are assumed to be display values inserted in the current version 30. A display value can be a text or a non-text. For instance the accessor engine 76 can be adapted to detect the presence of a pattern, for illustration in the FIG. 4 the pattern is HX40-$DD2.

In another example, the accessor engine 76 can be adapted to detect the existence of a target data belonging to a previous version of the document by applying a predefined function to a part of the current version of the document. For instance by applying a hash function to the first 5 lines (or records or cells) and comparing the result with a list of pre-stored reference hashes.

Regarding the detection of removed data, another option would be using the unique identifier (e.g. title, version and issuing date) of the enclosing document to look up the list of all sensitive data removed from the original, then using information from the meta data stored with each entry in that list to know which fields in the document are replacements. For example, a list of replacements can be retrieved from a specific document and the system 90 can find that the list includes a data located at cell B4 in the document.

The accessor engine 76 includes a second set of instructions that, when executed by the processor, cause said accessor engine to build a link value 35 allocated to the target data 22 by applying a preset function to a subset of the data found in the current version 30. In fact the accessor engine 76 is adapted to re-compute the link value which has been previously allocated to the target data.

The system 90 is configured to retrieve the metadata contained in the entry from a secure storage unit 60 by using the link value. Both the metadata and the link value are allocated to the same target data. The system 90 can be also configured to propose to the user 80 to get the target data using a message based on said metadata. For instance, the system 90 can display a message 36 describing the nature of the target data and ask consent of the user to reveal the target data. The message can be an audio message.

The system 90 is configured to get both agreement of the user and credentials of the user. For instance, the system may comprise an output device 72 that displays the message 36 to the user and an input device 73 (like a keyboard) allowing the user to enter his/her response and credentials. In one embodiment both the output device and the input device may be merged in a single hardware device, like a smart phone having a touch screen.

The system 90 may also comprise another input device (not shown)—also called security device—adapted to capture biometric data of the user 80.

In one embodiment, a user's secret key can be pre-stored in the system 90 and the system can include a security device able to automatically get the pre-stored secret key of the user 80.

The system 90 is configured to generate a request by using the link value 35 and user's credentials for retrieving the target data from the secure storage unit 60 only if the user gave his consent. The system 90 is also configured to forward the retrieved target data 22 to the output device 72 for rendering to the user only if the secure storage unit 60 sent back the target data. (I.e. if the secure storage unit 60 successfully checked the compliance of the request with its preset access rules.)

Preferably, the system can include a camera able to capture the current version 30 of the paper document and to perform optical character recognition (OCR).

In one embodiment, the system 90 can include a sensor able to capture tactile writing dedicated to blind or visually impaired people from the current version 30 of the document in paper form.

In one embodiment, the system 90 can render the full enhanced version of the document using augmented reality. For instance, the output device 72 may display the current version of the document and the retrieved target data superimposed.

When the current version 30 of the document contains a display value which has been inserted in place of the target data, the system 90 can be designed to replace the display value with the retrieved target data for rendering to the user via augmented reality.

In another embodiment, the user 80 can freely read a non-sensitive data 21 (from the current version 30 of the paper document) and get the sensitive data 22 through the output device 72.

In another embodiment (not shown), the accessor engine 76, the output device 72 and the input device 73 may be merged in a single hardware device.

FIG. 2 shows a flow chart for securely accessing a protected document according to an example of the invention.

A current version 30 of the document is assumed to have been generated and printed. In this example, the current version 30 comprises non-sensitive data only.

An example of current version 30 on paper form is shown at FIG. 4.

The current version of the paper document is made available to a user 80.

At step S10, the existence of a target data (i.e. sensitive data) belonging to an enhanced (e.g. initial or previous) version of the document and missing from the current version 30 of the document is detected. This detection operation is carried out on the basis of the current version 30 of the paper document only.

Alternatively, the list mentioned at FIG. 1 can be used to detect the existence of the target data 22.

At step S20, a subset of the content of the current version is identified in relation with the target data then a link value allocated to the target data is generated by applying a preset function to the identified subset.

If the current version 30 of the paper document is a text page, the accessor engine 76 can build the link value 35 by using a combination of unique and unvarying elements of the content, such as printed characters and numbers.

If the current version 30 is a spreadsheet, the accessor engine 76 can build the link value 35 by using that document title and the coordinates (e.g. sheet number, column, and row) of the spreadsheet cell intended to contain the target (sensitive) data.

Advantageously, the link value may be generated by concatenating a preset string with the built value. Assuming that the preset string is https://wxyz.com/app/, the generated link value may be https://wxyz.com/app/QWERTYAZ-ERTY.

The link value may be generated as a Uniform Resource Locator (URL).

Other examples for identifying the relevant input parameter(s) and the preset function can be applied to documents structured by lines. For instance, in a text file, the (non-sensitive) content of all odd lines preceding the line comprising the target data can be taken as input parameter(s) and the preset function can be a Hash function.

It is to be noted that each version of the document can be handled through several paper formats; using different character fonts, colors or layouts for examples. In other words, data belonging to the document may be expressed using different formats.

Different context information may be used from each version/format to derive the link. Preferably, the used context information are assumed not to change over time.

Alternatively, the context information may change from a version to another one (for instance by printing the document with different fonts, size or margins). In each case, the method of derivation must resolve to the same link value.

At step S30, a metadata is retrieved from the secure storage unit 60 by using the computed link value. Then a message based on said metadata is provided to the user to propose to get the target data. Preferably, the message may express the nature or type of target data to be retrieved. It can be a message in audio, textual, or tactile form.

As shown at FIG. 5 a smartphone 90 can display information related to the target data ("Passport number" and other data extracted from the retrieved metadata.)

At step S40, the system gets both the agreement (to retrieve the target data) of the user and credentials of the user. For instance, the user may be ask to enter a passphrase.

At step S50, a request is generated by using the link value and the user's credentials for retrieving the target data from the secure storage unit only if the user gave his agreement. The secure storage unit is intended to grant access to the user after a successful checking of the user's credentials.

At step S60, the user is provided with the target data retrieved from the relevant entry of secure storage unit only if the secure storage unit successfully checked the compliance of the request with preset access rules. (e.g. if the user is authorized to access the target data.)

For instance, the target data can be displayed to the user through augmented reality as shown at FIG. 6.

It is to be noted that request generation and request sending can be fully automated so that the user does not need to explicitly give his/her consent for retrieving the target data. In other words, the user may have given his/her consent during a previous phase. Thus user's agreement may be implicit.

In one embodiment the user may agree to reveal any (sensitive) data in the current document.

In one embodiment the user may agree to reveal any (sensitive) data in any document scanned for the period of time that the user's authentication session with the accessor software lasts.

In one embodiment, the user must authenticate each time a request to retrieve a sensitive data is received by the secure storage unit.

In another embodiment, the secure storage unit may authenticate the user only once and authorize further access from this user during a session without new credentials checking. For instance a session can be an authenticated context established between the user's web browser (hosted on the system 90) and the web server which provides access to the sensitive data. The session can be materialized as a cookie.

It must be understood, within the scope of the invention, that the above-described embodiments are provided as non-limitative examples. In particular, the features described in the presented embodiments and examples may be combined.

The invention applies to any types of access like read access and write access.

A secure storage unit can store data related to several enhanced versions of a plurality of documents.

The invention allows freely forwarding or distributing a paper document without revealing certain critical information. Moreover, the access control rules can be applied selectively based on who is accessing, on what device, from where as well as the class of the information.

Thanks to the invention, access to part of the document can be dynamically refined (Access rules can be changed at any time) since Access rules are enforced only when a user attempts to access the protected data.

In addition, the invention allows to centralize credentials management and highly ease the management of secret/encryption keys.

The architecture of the system shown at FIG. 1 is provided as example only. This architecture may be different. For example, the secure storage unit can include several databases or file systems. The secure storage unit can include a web server which manages the interface between users and the secure storage unit and performs checking operations for authentication and authorization of the user.

The invention claimed is:

1. A computer-implemented method for securely accessing a document containing a set of data by a user, the method comprising:
   from a current version of the document in paper form, detecting the existence of a target data belonging to an enhanced version of the document and missing from the current version of the document,
   generating a link value allocated to the target data by applying a preset function to a subset of said set of data,
   then retrieving a metadata from a secure storage unit by using the link value and, providing the user with a message based on said metadata to propose, to the user to get the target data,
   then getting an agreement of the user,
   then generating a request by using the link value for retrieving the target data from the secure storage unit only if the user gave his agreement,
   then providing the user with the target data only if the secure storage unit successfully checked the compliance of the request with preset access rules.

2. The method according to claim 1, wherein the subset of said set of data includes a display value that does not belong to the enhanced version.

3. The method according to claim 2, wherein the subset of said set of data includes a text and/or a non-text.

4. The method according to claim 2, wherein the target data is rendered to the user through augmented reality.

5. The method according to claim 1, wherein the subset of said set of data belongs to the enhanced version.

6. The method according to claim 1, wherein said message expresses the nature or the type of said target data.

7. The method according to claim 1, wherein credentials of the user are provided by the user each time a request to retrieve target data from the secure storage unit or only once during a previous phase.

8. A system for securely accessing a document containing a set of data, the system comprising a hardware processor,
   wherein the system comprises an accessor engine including instructions that, when executed by the processor, cause said accessor engine to:
      detect, from a current version of the document in paper form, the existence of a target data belonging to an enhanced version of the document and missing from the current version of the document,
      generate a link value allocated to the target data by applying a preset function to a subset of said set of data,
   wherein the system is configured to retrieve a metadata from a secure storage unit by using the generated link value and, to provide the user with a message based on said metadata to propose to a user to get the target data,
   wherein the system is configured to get an agreement of the user, and
   wherein the system is configured to generate a request by using the link value for retrieving the target data from the secure storage unit only if the user gave his agreement and to forward the retrieved target data to a output device for rendering to the user only if the secure storage unit successfully checked the compliance of the request with preset access rules.

9. The system according to claim 8, wherein the system is configured to render the target data to the user through augmented reality.

10. The system according to claim 9, wherein the current version comprises a display value and wherein the system is adapted to display the target data in place of display value.

11. The system according to claim 8, wherein the subset of said set of data includes a text and/or a non-text.

12. The system according to claim 8, wherein said target data is a sensitive data.

13. The system according to claim 8, wherein the system includes a capturing device able to perform optical character recognition.

14. The system according to claim 8, wherein the system includes a security device able to get a biometric data, a password or a user's secret key pre-stored in the system.

* * * * *